United States Patent
Zhang et al.

(10) Patent No.: US 10,803,893 B1
(45) Date of Patent: Oct. 13, 2020

(54) DATA TRANSFER SCHEDULING FOR FAIRNESS AND BALANCE

(71) Applicant: Seagate Technology LLC, Cupertino, CA (US)

(72) Inventors: JianZhong Zhang, Edina, MN (US); Mark A. Gaertner, Vadnais Heights, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/429,754

(22) Filed: Jun. 3, 2019

(51) Int. Cl.
| | |
|---|---|
| *G11B 5/00* | (2006.01) |
| *G11B 15/02* | (2006.01) |
| *G11B 5/55* | (2006.01) |
| *G06F 9/50* | (2006.01) |
| *G11B 15/467* | (2006.01) |
| *G06F 3/06* | (2006.01) |

(52) U.S. Cl.
CPC ............ *G11B 5/5578* (2013.01); *G06F 3/061* (2013.01); *G06F 3/0646* (2013.01); *G06F 3/0683* (2013.01); *G06F 9/5038* (2013.01); *G11B 15/467* (2013.01)

(58) Field of Classification Search
CPC ... G11B 21/025; G11B 5/4886; G11B 5/5578; G11B 5/09; G11B 27/36; G11B 5/00; G11B 20/10; G11B 20/20; G11B 5/52; G11B 15/02; G11B 19/02
USPC ................ 360/24, 31, 39, 55, 70, 62, 63, 64
See application file for complete search history.

(56) References Cited

U.S. PATENT DOCUMENTS

| | | | |
|---|---|---|---|
| 4,270,154 A | | 5/1981 | Crawford |
| 4,423,448 A | | 12/1983 | Frandsen |
| 4,544,972 A | | 10/1985 | Kogure et al. |
| 4,937,693 A | | 6/1990 | Connolly et al. |
| 4,959,782 A | | 9/1990 | Tulpule et al. |
| 5,223,993 A | | 6/1993 | Squires et al. |
| 5,261,058 A | | 11/1993 | Squires et al. |
| 5,274,773 A | | 12/1993 | Squires et al. |
| 5,293,282 A | | 3/1994 | Squires et al. |
| 5,341,351 A | | 8/1994 | Ng |
| 5,343,345 A | | 8/1994 | Gilovich |
| 5,343,347 A | | 8/1994 | Gilovich |
| 5,355,486 A | * | 10/1994 | Cornaby ................ G11B 19/02 360/77.08 |
| 5,412,666 A | | 5/1995 | Squires et al. |
| 5,475,498 A | * | 12/1995 | Radice ............ G11B 20/10527 360/32 |
| 5,477,401 A | | 12/1995 | Squires et al. |
| 5,523,901 A | | 6/1996 | Anderson et al. |
| 5,566,348 A | * | 10/1996 | Dahman ................ G06F 3/0601 369/30.3 |
| 5,610,808 A | * | 3/1997 | Squires ................ G06F 3/0676 700/2 |
| 5,694,581 A | | 12/1997 | Cheng |
| 5,761,007 A | | 6/1998 | Price et al. |
| 5,805,386 A | | 9/1998 | Faris |

(Continued)

*Primary Examiner* — Nabil Z Hindi
(74) *Attorney, Agent, or Firm* — Feagre Drinker Biddle & Reath LLP

(57) ABSTRACT

A method for scheduling data transfer commands between a first actuator or a second actuator across an interface is disclosed. The method includes balancing data transfer commands between the first actuator and the second actuator by applying a first rule for read commands and a second rule for write commands.

20 Claims, 4 Drawing Sheets

(56) References Cited

U.S. PATENT DOCUMENTS

| | | |
|---|---|---|
| 5,983,485 A | 11/1999 | Misso |
| 6,005,743 A | 12/1999 | Price et al. |
| 6,005,747 A | 12/1999 | Gilovich |
| 6,057,990 A | 5/2000 | Gilovich |
| 6,121,742 A | 9/2000 | Misso |
| 6,344,938 B1 | 2/2002 | Smith |
| 6,384,998 B1 | 5/2002 | Price et al. |
| 6,437,937 B1 * | 8/2002 | Guo ............... G11B 5/5552 360/63 |
| 6,449,130 B1 | 9/2002 | Koyama |
| 6,490,138 B1 | 12/2002 | Prater |
| 6,493,172 B1 | 12/2002 | Morris et al. |
| 6,519,109 B1 | 2/2003 | Price et al. |
| 6,560,075 B2 | 5/2003 | Price et al. |
| 6,563,657 B1 | 5/2003 | Serrano et al. |
| 6,603,640 B1 | 8/2003 | Prater et al. |
| 6,678,120 B2 | 1/2004 | Money |
| 6,687,092 B2 | 2/2004 | Kan et al. |
| 6,690,549 B1 | 2/2004 | Aikawa et al. |
| 6,735,032 B2 | 5/2004 | Dunn et al. |
| 6,819,513 B2 | 11/2004 | Chainer et al. |
| 6,847,504 B1 | 1/2005 | Bennett et al. |
| 7,031,115 B1 | 4/2006 | Gilovich |
| 7,102,842 B1 * | 9/2006 | Howard ............... G11B 5/5521 360/61 |
| 7,146,623 B2 | 12/2006 | Kuwajima et al. |
| 7,199,981 B2 | 4/2007 | Zabtcioglu |
| 7,272,697 B2 * | 9/2007 | Klein .................... G06F 3/0601 711/112 |
| 7,315,429 B2 | 1/2008 | van Zyl |
| 7,385,781 B1 | 6/2008 | Craig et al. |
| 7,430,091 B2 | 9/2008 | Manasse |
| 7,469,463 B2 | 12/2008 | Prater et al. |
| 7,492,542 B2 | 2/2009 | van Zyl |
| 7,710,683 B2 | 5/2010 | Craig et al. |
| 7,760,463 B2 | 7/2010 | Ward et al. |
| 8,028,311 B2 | 9/2011 | Gilovich |
| 8,607,007 B2 * | 12/2013 | Lee ....................... G06F 3/0625 711/154 |
| 9,830,939 B1 | 11/2017 | Hamilton |
| 10,090,017 B2 * | 10/2018 | Gartee ................ G11B 21/025 |
| 2002/0039259 A1 | 4/2002 | Koyama et al. |
| 2002/0060885 A1 | 5/2002 | Money |
| 2003/0090838 A1 | 5/2003 | Pottebaum et al. |
| 2007/0297083 A1 | 12/2007 | Deguchi et al. |
| 2012/0250177 A1 | 10/2012 | Somanache et al. |

* cited by examiner

US 10,803,893 B1

DATA TRANSFER SCHEDULING FOR FAIRNESS AND BALANCE

SUMMARY

In certain embodiments, a method for scheduling data transfer commands between a first actuator or a second actuator across an interface is disclosed. The method includes balancing data transfer commands between the first actuator and the second actuator by applying a first rule for read commands and a second rule for write commands.

In certain embodiments, a data storage device includes a first actuator, a second actuator, an interface, a data buffer, and circuitry. The first actuator positions a first read/write head, and the second actuator positions a second read/write head. The interface includes a data path, which is communicatively coupled to the first read/write head and the second read/write head. The data buffer is communicatively coupled between the data path and the first read/write head and the second read/write head. The circuitry is configured to schedule data transfer commands across the data path between the first actuator and the second actuator by applying a first rule for read commands and a second rule for write commands.

In certain embodiments, a system on a chip includes circuitry, which is configured to apply a first rule for read commands and apply a second rule for write commands.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
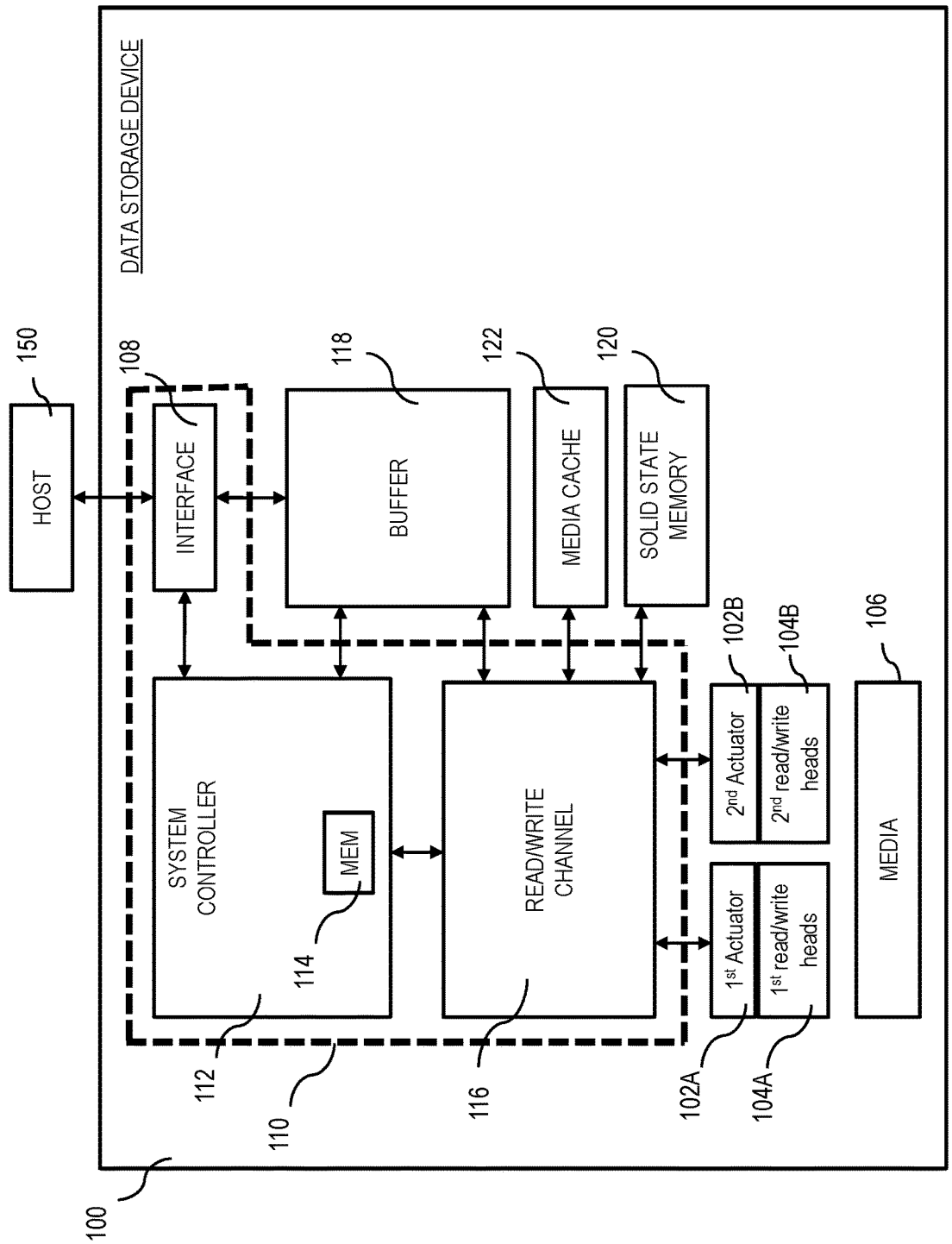
FIG. 1 shows a simplified schematic of a data storage device, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Data storage systems (e.g., servers) can include multiple data storage devices (e.g., solid state drives, hard disk drives) that are operated and accessed in parallel to increase the amount of data that can be stored and accessed. For example, servers may include multiple hard disk drives that are performing read and/or write operations in parallel. Each data storage device in a data storage system may be assigned and identified by the system by a separate logical unit number (hereafter "Lun"). Similarly, hard disk drives can include multiple actuators, each with read/write heads that themselves are performing read and/or write operations in parallel. Each actuator in a data storage device may be assigned and identified by a data storage system by a separate Lun.

Data storage systems and/or data storage devices may have fewer data paths through which to transfer data compared to the number of Luns (e.g., number of data storage devices in a data storage system or number of actuators in a data storage device). This can restrict the rate at which data is transferred to and from the Luns. As a result, the Luns' performance can become unbalanced such that the Luns are not being used equivalently. Further, the data path(s) may sit idle while the data storage systems or the data storage devices access requested data. Certain embodiments of the present disclosure are accordingly directed to scheduling data transfer commands to balance how data is transferred to and from Luns in a data storage system or a data storage device. Although the various approaches described below are described in the context of a data storage device with multiple actuators, the approaches can be applicable to data storage systems and other data storage devices without actuators such as solid state drives.

Figure 2:
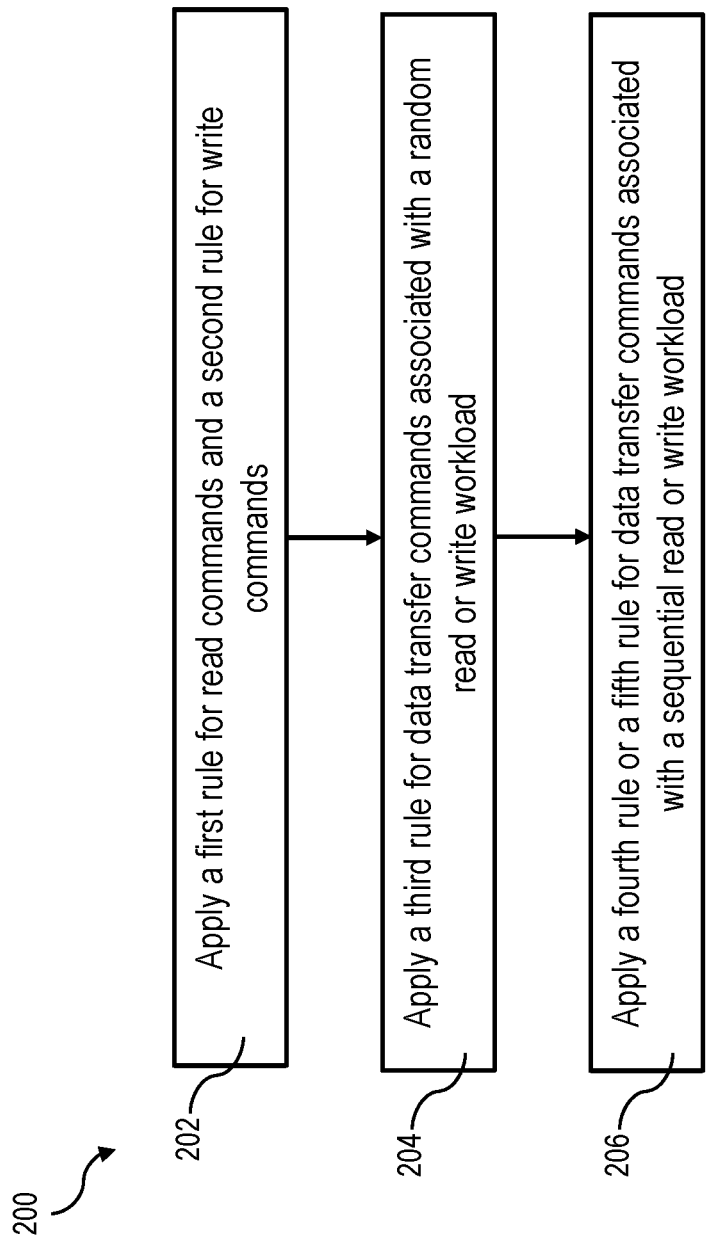
FIG. 2 depicts a block diagram of steps of a data transfer method, in accordance with certain embodiments of the present disclosure.
Figure 3:
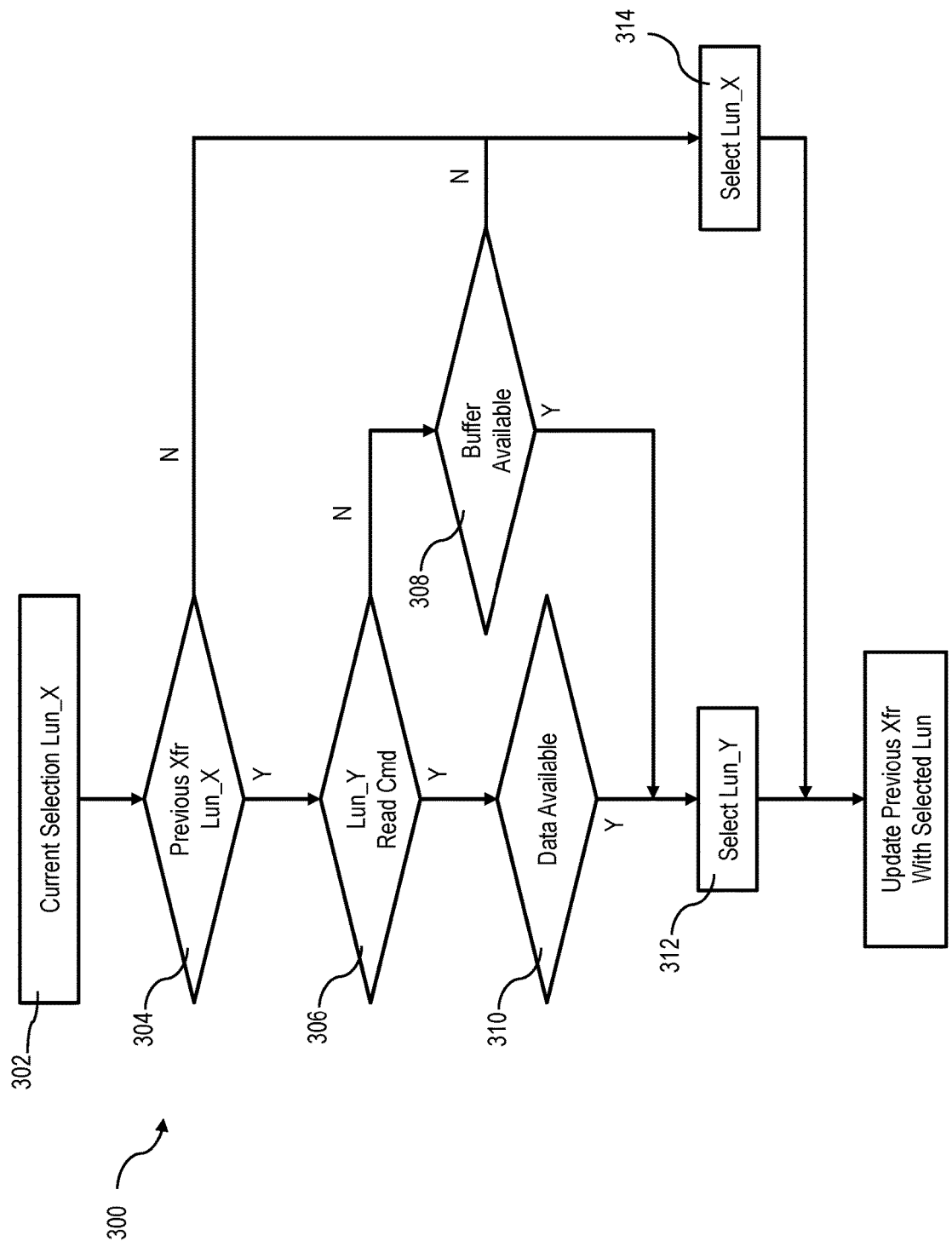
FIG. 3 depicts a block diagram of steps of a data transfer method for random read/write commands, in accordance with certain embodiments of the present disclosure.
Figure 4:
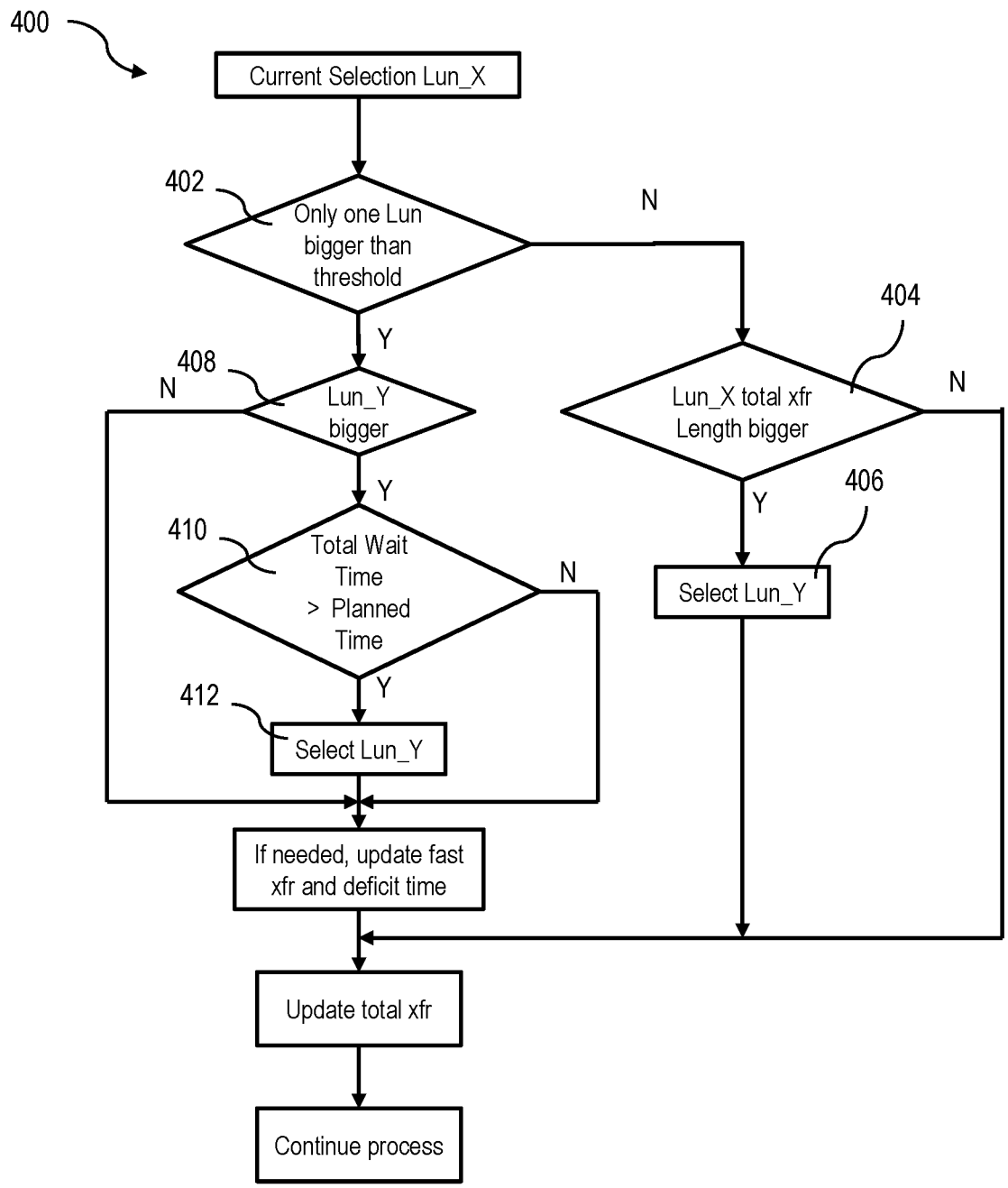
FIG. 4 depicts a block diagram of steps of a data transfer method for sequential read/write commands, in accordance with certain embodiments of the present disclosure.

FIG. 1 shows a schematic of a data storage device 100 such as a hard disk drive. FIGS. 2-4 show various steps of methods that can be carried out by the data storage device 100. In the case of a hard disk drive, the data storage device 100 can include multiple actuators (i.e., a first actuator 102A and a second actuator 102B) each with one or more read/write heads 104A and 104B to provide concurrent access to magnetic recording media 106 (e.g., magnetic recording disks). In certain embodiments, the multiple actuators 102A and 102B share a common pivot axis and are positioned in a stacked arrangement. In such embodiments, the read/write heads 104A coupled to the first actuator 102A access different surfaces of the magnetic recording media 106 than the read/write heads 104B coupled to the second actuator 102B. In other embodiments, the multiple actuators 102A and 102B have separate pivot axes. In such embodiments, the read/write heads 104A coupled to the first actuator 102A access the same magnetic recording media 106 as the read/write heads 104B coupled to the second actuator 102B.

The data storage device 100 include an interface 108 (e.g., an input/output interface) for transferring data to and from the data storage device 100. For example, the interface 108, among other features, can be communicatively coupled between a host 150 (e.g., a data storage system such as a server or laptop) and the read/write heads 104A and 104B to facilitate communication between the the read/write heads 104A and 104B and the host 150. The data storage device 100 includes fewer data paths (i.e., one interface 108 with one data path) than the number of actuators (i.e., two actuators 102A and 102B).

To balance how data is transferred through the interface 108, the data storage device 100 can include logic (described in more detail below) stored as instructions (e.g., firmware) that dictate how data transfer commands are scheduled to be transferred through the interface 108 shared between the multiple actuators 102A and 102B. Although only two actuators for the data storage device 100 are shown in FIG. 1, additional actuators can be incorporated into the data storage device 100. Further, in certain embodiments, interfaces can include more than one data path.

The data storage device 100 can include a system on a chip ("SOC") 110 (shown in dashed lines) that includes a system controller 112 and its associated memory 114. The interface 108 may also be part of the SOC 110. The SOC 110 can also include a read/write channel 116, which can encode data associated with write commands and decode data associated with read commands. The SOC 110 may be an integrated circuit such as an application-specific integrated circuit ("ASIC") and field-programmable gate array ("FPGA") that includes instructions for carrying out various functions of the data storage device 100.

The system controller 112 can be coupled to and control access to a buffer 118, which can temporarily store data associated with read commands and write commands. The buffer 118 can be a volatile memory, such as a dynamic random access memory ("DRAM"), static random access memory ("SRAM"), or other volatile memory.

The read/write channel 116 may be coupled to a solid state memory 120 (via a formatter and with buffer manager logic located therebetween). The solid state memory 120 may be a volatile memory, such as DRAM, or a non-volatile memory, such as flash memory and the like.

The data storage device 100 can also include a media cache 122. The media cache 122 may be a partition of the magnetic recording media 106 that is reserved for the media cache 122. The media cache 122 may be used to store a large amount of data to be readily accessible, available and aggregated, potentially reducing the time required to carry out data transfer commands.

During operation, the data storage device 100 receives various data transfer commands (e.g., a read command or a write command) from the host 150. In a multi-actuator data storage device 100, the host 150 may view each actuator 102A and 102B of the data storage device 100 as a separate data storage device. As such, each data transfer command may be directed to a particular actuator (e.g., a read command for data accessible by the first actuator 102A, a write command to write data to media accessible by the second actuator 102B).

Data associated with a write command may be received from the host 150 by the interface 108 and initially stored to the buffer 118. The data is encoded or otherwise processed by the read/write channel 116 and eventually stored to the magnetic recording media 106 via one of the read/write heads 104A or 104B coupled to the respective first actuator 102A and the second actuator 102B. In certain embodiments, the data is stored to the media cache 122 before its final position on the magnetic recording media 106. Data associated with a read command may be retrieved from the magnetic recording media 106 or media cache 122 and stored in the buffer 118. Such data is then transferred to the host 150 by the interface 108. While data is being transferred over the interface 108 in response to a read command or write command, the interface 108 (assuming only one data path) cannot be used to transfer data associated with a separate read command or write command. As such, subsequent data transfers have to wait for previously-scheduled data transfers to complete before starting.

As mentioned above, the data storage device 100 can include logic that dictates how data transfer commands are scheduled to balance how data is transferred through the interface 108 shared between the multiple actuators 102A and 102B. Such logic may be stored and executed by components of the data storage device such as the SOC 110. For example, the logic may be stored in the memory 114 of the system controller 112. FIGS. 2-4 outline various aspects of how data transfer commands can be scheduled to balance use of the interface 108 and the multiple actuators 102A and 102B.

FIG. 2 outlines a method 200 for scheduling data transfer commands. The method 200 includes applying one or more rules, depending on a given scenario, to balance input/output operations per second (IOPS) between the first actuator 102A and the second actuator 102B. For example, a first rule can be applied for read commands and a second rule for write commands (block 202 in FIG. 2).

The first rule includes only scheduling read commands that are associated with data at least partially stored in the buffer 118. In certain embodiments, a read command is able to be scheduled only if all of the requested data is available in the buffer 118. In other embodiments, a read command is able to be scheduled only if the requested data is partially available in the buffer 118 and the requested data not in the buffer 118 can be continuously transferred to the buffer 118 without interruption before completing the read command. In both embodiments, the read command is scheduled when the requested data is available such that it can be continuously transferred through the interface 108. As such, the interface 108 can be continuously used without waiting for currently unavailable data to be made available to the buffer 118 (and therefore to the interface 108).

The second rule includes only scheduling write commands that are associated with an amount of data that can be stored to available capacity of the buffer 118. In certain embodiments, a write command is able to be scheduled only if the buffer 118 has enough available capacity to store all of the to-be-written data. In other embodiments, a write command is able to be scheduled only if the buffer 118 has enough available capacity to store and/or empty the buffer 118 such that all of the to-be-written data can be continuously transferred to the buffer 118 (and therefore across the interface 108) without interruption before completing the write command. In both approaches, the write command is scheduled when the buffer 118 has enough available capacity for the to-be-written data to be continuously transferred through the interface 108. As such, the interface 108 can be continuously used without waiting for the buffer 118 to empty some of its contents before transferring data across the interface 108.

The method 200 also includes applying a third rule for data transfer commands associated with a random read or write workload (block 204 in FIG. 2) and a fourth rule or a fifth rule for data transfer commands associated with a sequential read or write workload (block 206 in FIG. 2). An example third rule for random workloads is outlined in FIG. 3 and described in more detail below, and example fourth and fifth rules for sequential workloads are outlined in FIG. 4 and described in more detail below. Determining whether a workload is random or sequential can be based on the logical block addresses ("LBAs") being accessed by the data transfer command. For example, a sequential workload accesses data stored on a sequential range of LBAs while a random workload does not.

FIG. 3 outlines a method 300 for scheduling data transfer commands associated with commands for random workloads. The method 300 shown in FIG. 3 uses as an example, two Luns (e.g., two actuators 102A and 102B in the data storage device 100 of FIG. 1), but similar approaches can be used with more Luns.

The method 300 can select and assign a data path to either a first Lun (referred to as Lun_X in FIG. 3) and a second Lun (referred to as Lun_Y in FIG. 3). The method 300 attempts to give both Luns opportunities to deliver similar or equivalent input/output operations per second (IOPS). In short, the method 300 does so by checking whether, given a data transfer command, the Lun not currently selected can satisfy a read-command rule (e.g., the first rule) and a write-command rule (e.g., the second rule) described above. If the unselected Lun can satisfy the applicable rule, then that Lun is selected for the next data transfer command. This approach for random workloads is shown in FIG. 3's flowchart. The method 300 outlined in FIG. 3 assumes that Lun_X is currently selected for a data transfer (block 302 in FIG. 3). When the prior data transfer (here, the current selection of Lun_X) was for Lun_X (block 304 in FIG. 3), the method 300 checks for whether it is fair to schedule another data transfer for Lun_X (blocks 306-310). Fairness for random workloads is determined by whether Lun_Y (i.e., the unselected Lun) can meet the read-command rule (blocks 306 and 308 in FIG. 3) if the data transfer command is a read command or whether Lun_Y can meet the write-command rule (block 310 in FIG. 3) if the data transfer command is a write command. If Lun_Y meets the criteria of the applicable rule, then Lun_Y is selected for the next data transfer (block 312 in FIG. 3). Otherwise, Lun_X is selected again (block 314 in FIG. 3).

FIG. 4 outlines a method 400 for scheduling data transfer commands associated with commands for sequential workloads. Like the method 300 in FIG. 3, the method 400 shown in FIG. 4 uses, as an example, two Luns. A first Lun is referred to as Lun_X in FIG. 4, and a second Lun is referred to as Lun_Y in FIG. 4.

In sequential workloads, performance is measured in terms of a sustained data rate. Meeting the sustained data rate depends on scheduling commands with a data transfer length (e.g., number of sectors to transfer) that is larger than a transfer length threshold. The particular value for the transfer length threshold may vary depending on a given product's configuration.

For sequential workloads, data transfers can be balanced between Luns depending on two different scenarios and therefore apply respective rules (e.g., a fourth rule for the first scenario and a fifth rule for the second scenario). The method 400 first determines which scenario is applicable (block 402 in FIG. 4). The first scenario involves the two Luns having data transfer lengths that are either both less than a transfer length threshold or both larger than the transfer length threshold. The respective data transfer lengths can be equal or different under this first scenario. To accomplish substantially equivalent throughput for the two Luns, the total transfer length associated with each Lun is tracked. When one of the Luns must be selected, the total transfer lengths of the Luns will be compared, and the Lun with a lower total transfer length will be selected for the next data transfer (blocks 404 and 406 in FIG. 4).

The second scenario involves the two Luns having different transfer lengths—one of which is less than the transfer length threshold and one of which is larger than the transfer length threshold. For the second scenario, the method 400 attempts to meet a sustained data rate associated with the transfer length threshold. In particular, the method 400 prioritizes large data transfers until such data transfers can no longer meet the sustained data rate. For example, block 408 of FIG. 4 first determines whether a data transfer for Lun_Y is larger than the current data transfer.

Next, as noted in block 410 of FIG. 4, what is referred to as the Total Wait Time (e.g., a summation of a wait time and a deficit time) is compared to what is referred to as a Planned Time (e.g., a summation of a frequency interval and a saving time). If the Total Wait Time is greater than the Planned Time, then the Lun_Y data transfer is scheduled to be completed (block 412 of FIG. 4). The wait time is calculated by substracting the last data transfer time from the current time (i.e., Wait_Time=Current_Time−Last_Xfr_Time).

The deficit tracks how much time is missed when one Lun misses a data transfer. For example, if a data transfer is scheduled to start at 11:30:00:00 am, but the data is actually transferred at 11:30:00:01 am, the deficit time is 1 millisecond.

The data storage device may require that a command with transfer length Y has to be scheduled once for transfer to the host every Freq_Interval second such that the sustained data rate is satisfied. For example, if the desired sustained data rate is 100 MB per second and the transfer length is 1 MB, the data transfer has to occur 100 times in one second. The frequency interval is the interval to start a data transfer and is calculated as follows: Y/(256*X) second, where Y is the transfer length in terms of number of sectors based on a 4K sector size and X is the media rate in terms of MB.

The saving time tracks how much time one Lun schedules a data transfer earlier than the frequency interval and is calculated by determining the difference in the amount of time between the frequency interval and the scheduled data transfer For example, if the transfer length is 1 MB and has to occur every 10 milliseconds, the savings time is 1 millisecond if the data transfer only took 9 milliseconds.

As mentioned above, the methods disclosed herein and outlined in the figures can be executed by circuitry of the data storage device 100. For example, the SOC 110 comprising the system controller 112 and/or the read/write channel 116 can carry out the disclosed methods.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method comprising:
    scheduling separate data transfer commands across an interface to balance the data transfer commands between either a first actuator or a second actuator by applying a first rule for read commands and a second rule for write commands that is different than the first rule, the first rule including only scheduling read commands associated with data at least partially stored in a data buffer.

2. The method of claim 1, wherein the first rule includes only scheduling read commands associated with data completely stored in a data buffer.

3. The method of claim 1, wherein the second rule includes only scheduling write commands associated with an amount of data that can be stored to available capacity of a data buffer.

4. The method of claim 1, wherein scheduling the data transfer commands between the first actuator and the second actuator further includes applying a third rule for a random data transfer command.

5. The method of claim 4, wherein the third rule includes determining whether a currently-unselected first or second actuator satisfies either the first rule or the second rule.

6. The method of claim 1, wherein scheduling the data transfer commands between the first actuator and the second actuator further includes applying a fourth rule or a fifth rule for a sequential data transfer command.

7. The method of claim 6, wherein the fourth rule includes comparing total transfer lengths of the first actuator and the second actuator and selecting the actuator associated with a lower total transfer length.

8. The method of claim 6, wherein the fifth rule prioritizes data transfers that can meet a minimum sustained data rate.

9. The method of claim 1, wherein all data transfers are transmitted to and from the data storage device through a single data path in the interface.

10. A data storage device comprising:
a first actuator for positioning a first read/write head;
a second actuator for positioning a second read/write head;
an interface with a data path communicatively coupled to the first read/write head and the second read/write head;
a data buffer communicatively coupled between the data path and the first read/write head and the second read/write head; and
circuitry configured to schedule separate data transfer commands across the data path between either the first actuator or the second actuator by applying: (1) a first rule for read commands, (2) a second rule for write commands that is different than the first rule, and (3) a third rule for random data transfer commands.

11. The data storage device of claim 10, wherein the first rule includes only scheduling read commands associated with data at least partially stored in the data buffer.

12. The data storage device of claim 10, wherein the second rule includes only scheduling write commands associated with an amount of data that can be stored to available capacity of the data buffer.

13. The data storage device of claim 10, wherein the third rule includes determining whether a currently-unselected first or second actuator satisfies either the first rule or the second rule.

14. The data storage device of claim 10, wherein scheduling data transfer commands further includes applying a fourth rule or a fifth rule for a sequential data transfer command.

15. The data storage device of claim 14, wherein the fourth rule includes comparing total transfer lengths of the first actuator and the second actuator and selecting the actuator associated with a lower total transfer length.

16. The data storage device of claim 14, wherein the fifth rule prioritizes data transfers that can meet a minimum sustained data rate.

17. A system on a chip comprising:
an interface with a single data path configured to be coupled between a host and a first set of read/write heads on a first actuator and a second set of read/write heads on a second actuator; and
circuitry configured to balance separate data transfer commands for either the first set of read/write heads or the second read/write heads across the single data path by:
applying a first rule for read commands, and
applying a second rule for write commands.

18. The system on a chip of claim 17, wherein the circuitry is further configured to balance separate data transfer commands for either first set of read/write heads or the second read/write heads across the single data path by:
applying a third rule for random workloads, and
applying a fourth rule for sequential workloads.

19. The data storage device of claim 10, wherein the first actuator is coupled a first set of read/write heads including the first read/write head, wherein the second actuator is coupled to a second set of read/write heads including the second read/write head.

20. The system on a chip of claim 17, wherein the first rule includes only scheduling read commands associated with data at least partially stored in a data buffer, wherein the second rule includes only scheduling write commands associated with an amount of data that can be stored to available capacity of the data buffer.

* * * * *